United States Patent [19]
Uramichi

[11] Patent Number: 5,632,525
[45] Date of Patent: May 27, 1997

[54] RECLINING DEVICE FOR VEHICLE SEAT

[75] Inventor: Hideki Uramichi, Toyota, Japan

[73] Assignee: Araco Kabushiki Kaisha, Aichi-ken, Japan

[21] Appl. No.: 512,433

[22] Filed: Aug. 8, 1995

[30] Foreign Application Priority Data

Aug. 11, 1994 [JP] Japan .................. 6-189609

[51] Int. Cl.⁶ .................................................. B60N 2/20
[52] U.S. Cl. ........................... 297/367; 297/378.12
[58] Field of Search ............................... 297/362, 367, 297/378.12

[56] References Cited

U.S. PATENT DOCUMENTS

| | | | |
|---|---|---|---|
| 3,008,765 | 11/1961 | Tischler et al. | 297/367 |
| 4,103,970 | 8/1978 | Homier | 297/367 X |
| 4,523,786 | 6/1985 | Letournoux et al. | 297/367 |
| 4,770,464 | 9/1988 | Pipon et al. | 297/367 |
| 4,874,205 | 10/1989 | Arefinejad et al. | 297/367 X |

FOREIGN PATENT DOCUMENTS

| | | | |
|---|---|---|---|
| 2225283 | 11/1974 | France | 297/367 |
| 47-19520 | 9/1972 | Japan . | |
| 51-20768 | 6/1976 | Japan . | |
| 53-95757 | 8/1978 | Japan . | |
| 53-113659 | 10/1978 | Japan . | |
| 59-166105 | 9/1984 | Japan . | |
| 63-65327 | 12/1988 | Japan . | |
| 3-52965 | 8/1991 | Japan . | |
| 5-60924 | 9/1993 | Japan . | |

*Primary Examiner*—Peter R. Brown
*Attorney, Agent, or Firm*—Hazel & Thomas

[57] ABSTRACT

A reclining device for a vehicle seat is composed of first and second arm members connected with each other for relative rotation about a hinge center axis line. The second arm member is formed with a semi-circular internal tooth portion concentrical with the hinge center axis line. A slide pawl is slidably supported on the first arm member to be moved in a radial direction with respect to the hinge center axis line and has a semi-circular external tooth portion engageable with the internal tooth portion of second arm member. A release shaft is rotatably supported on the first arm member coaxially with the hinge center axis line and is loaded by a spring in a rotational direction. A release arm is integrally formed with one end of the release shaft to rotate the release shaft against the load of the spring. An interlocking mechanism is provided between the release shaft and the slide pawl to engage the external tooth portion of the slide pawl with the internal tooth portion of the second arm member under the load of the spring. The first arm member is formed with an annular protruded portion while the second arm member is formed with an annular recessed portion which is coupled with the annular protruded portion of the first arm member for relative rotation about the hinge center axis line. The slide pawl and the interlocking mechanisms are disposed between the first and second arm members radially inside the internal tooth portion of the second arm member.

5 Claims, 7 Drawing Sheets

5,632,525

RECLINING DEVICE FOR VEHICLE SEAT

BACKGROUND OF THE INVENTION

1. Field of the Invention

The present invention relates to a reclining device for a vehicle seat.

2. Description of the Prior Art

Disclosed in Japanese Patent Publication Nos. 63(1988)-65327 and 3(1991)-52965 is a reclining device which includes a first arm member fixed to one side of a frame structure of a seat cushion, a second arm member fixed to one side of a frame structure of a back rest and connected with the first arm member by means of a hinge pin for relative rotation about the hinge pin, the second arm member being formed with an internal tooth portion concentrical with the hinge pin, a slide pawl slidably supported on the first arm member to be moved in a radial direction with respect to the hinge pin for engagement with the internal tooth portion of the second arm member, and a cam element rotatably mounted on the hinge pin to move the slide pawl toward and away from the internal tooth portion of the second arm member.

In such a conventional reclining device as described above, the cam element is slightly moved by a rotational force applied to the second arm since the first and second arm members are connected with each other through the cam element.

Further, the first and second arm members are connected with each other through the cam element. This causes unwanted movement of the slide pawl, resulting in unexpected disengagement of the slide pawl from the internal tooth portion of the second arm member. Moreover, if the internal tooth portion of the second arm member is formed smaller in its pitch diameter to provide the reclining device in a small size, the cam element becomes small in size, resulting in a decrease in the connecting strength of the first and second arm members.

SUMMARY OF THE INVENTION

It Is, therefore, a primary object of the present invention to provide an improved reclining device capable of overcoming the problems described above.

According to the present invention, there is provide a reclining device for a vehicle seat, which comprises a first arm member for attachment with a frame structure of a seat cushion or a back rest of the vehicle seat; a second arm member for attachment with a frame structure of the back rest or the seat cushion and connected with the first arm member for relative rotation about a hinge center axis line, the second arm member being formed with an arc shaped internal tooth portion that extends less than 180° and is concentric with the hinge center axis line; a slide pawl slidably supported on the first arm member to be moved In a radial direction with respect to the hinge center axis line and having an arcuate external tooth portion engageable with the internal tooth portion of the second arm member; a release shaft rotatably supported on the first arm member coaxially with the hinge center axis line and being loaded by resilient means in a rotational direction; a release arm integral with one end of the release shaft to rotate the release shaft against the load of the resilient means; and interlocking means provided between the release shaft and the slide pawl to maintain engagement of the external tooth portion of the slide pawl with the internal tooth portion of the second arm member under the load of the resilient means; wherein the first arm member is formed with an annular protruded portion while the second arm member is formed with an annular recessed portion which is coupled with the annular protruded portion of the first arm member for relative rotation about the hinge center axis line, the internal tooth portion of the second arm member is located radially inside the annular recessed portion, and the slide pawl and the interlocking means are disposed between the first and second arm members radially inside the internal tooth portion of the second arm member.

In a practical embodiment of the present invention, it is preferable that the first arm member is formed with a an arcuate internal tooth portion the pitch diameter and profile of which are the same as those of the internal tooth portion of the second arm member. The internal tooth portion of the first arm member is arranged to be engageable with the external tooth portion of the slide pawl.

BRIEF DESCRIPTION OF THE DRAWINGS

Other objects, features and advantages of the present invention will be more readily appreciated from the following description of a preferred embodiment thereof when taken together with the accompanying drawings, in which.

DESCRIPTION OF THE PREFERRED EMBODIMENT

Figure 1:
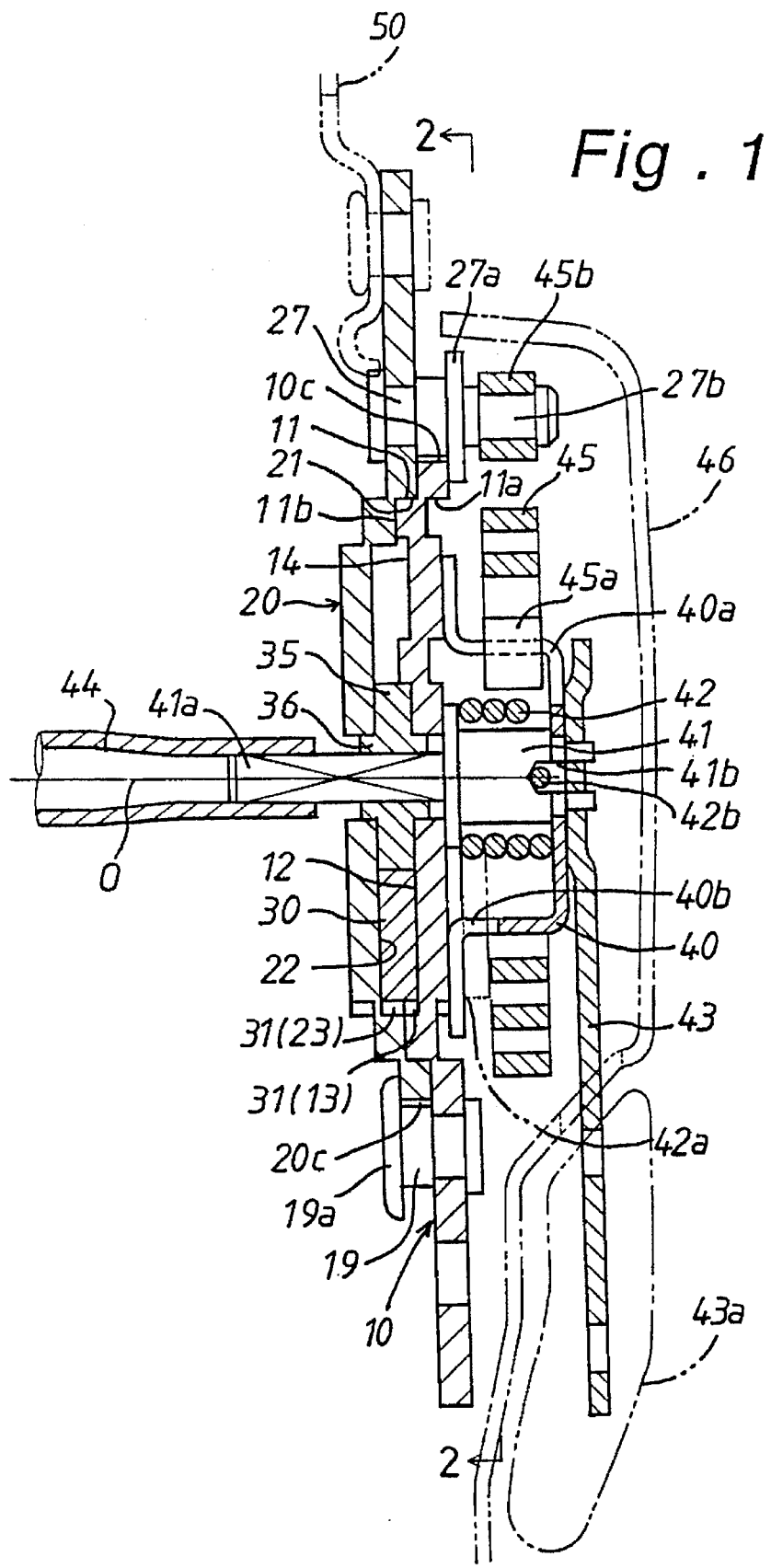
FIG. 1 is a vertical sectional view of a reclining device for a vehicle seat in accordance with the present invention.
Figure 2:
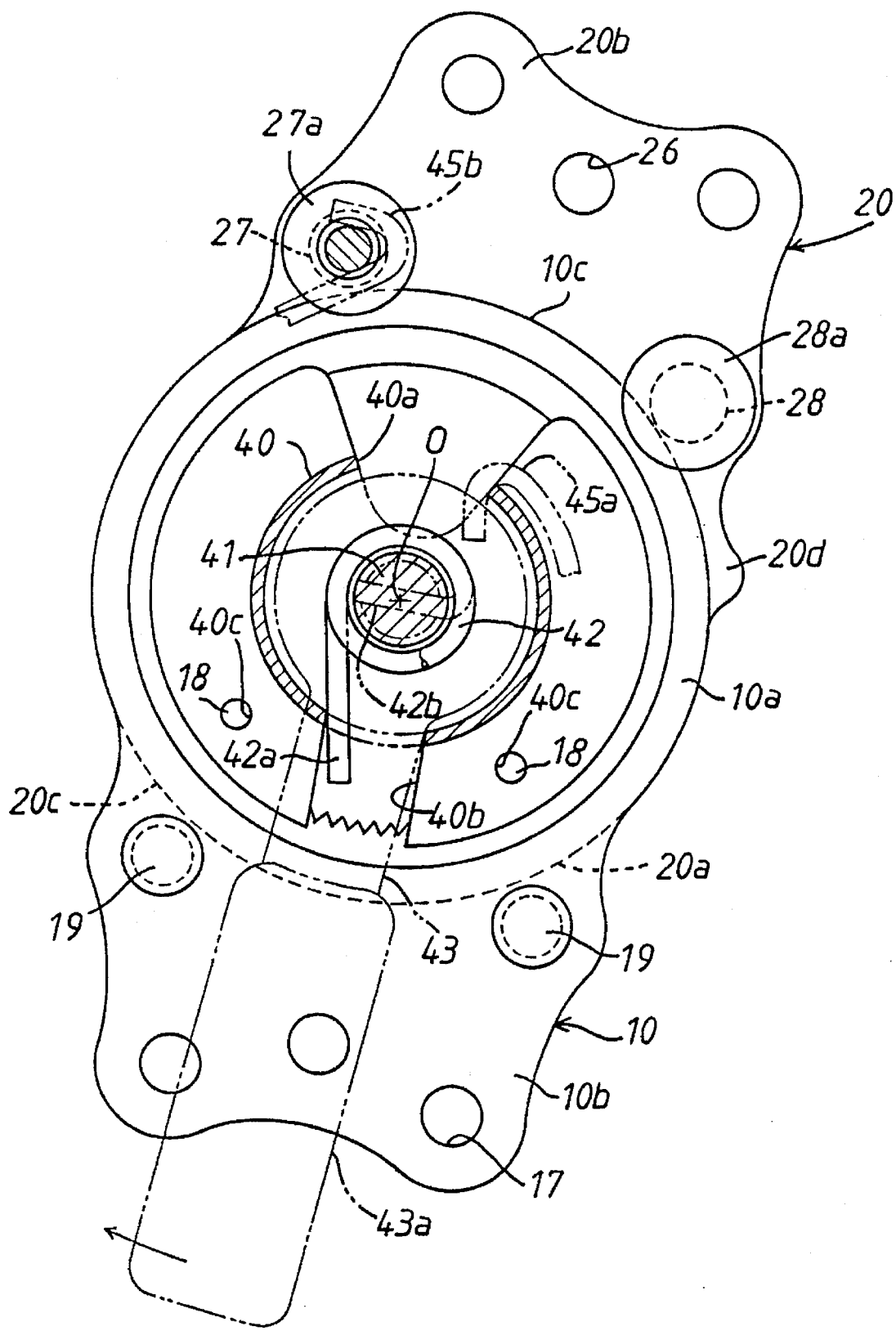
FIG. 2 is a cross-sectional view taken along line 2—2 in FIG. 1.
Figure 5:
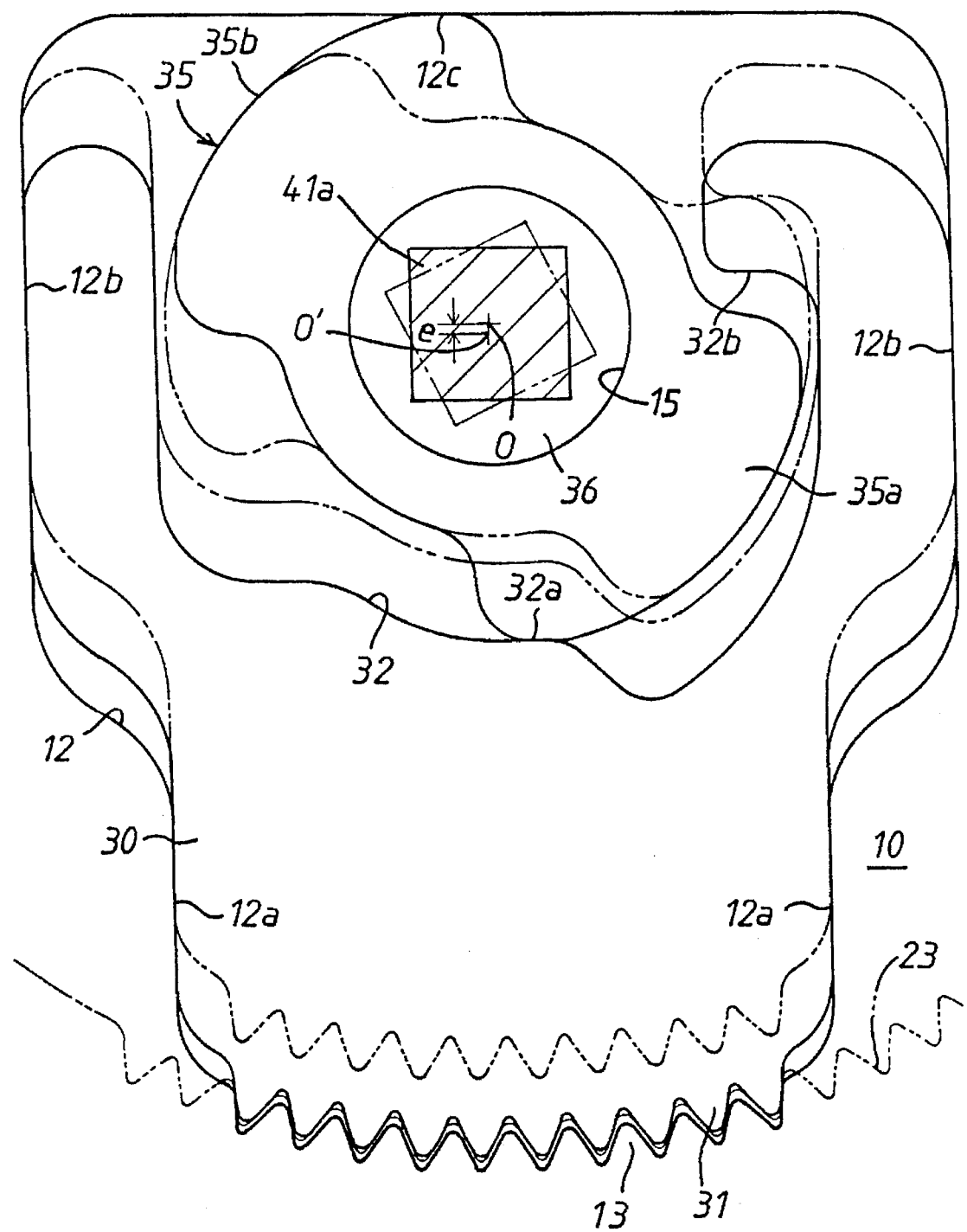
FIG. 5 is an enlarged front view of a slide pawl, a cam element and related parts shown in FIG. 1.
Figure 6:
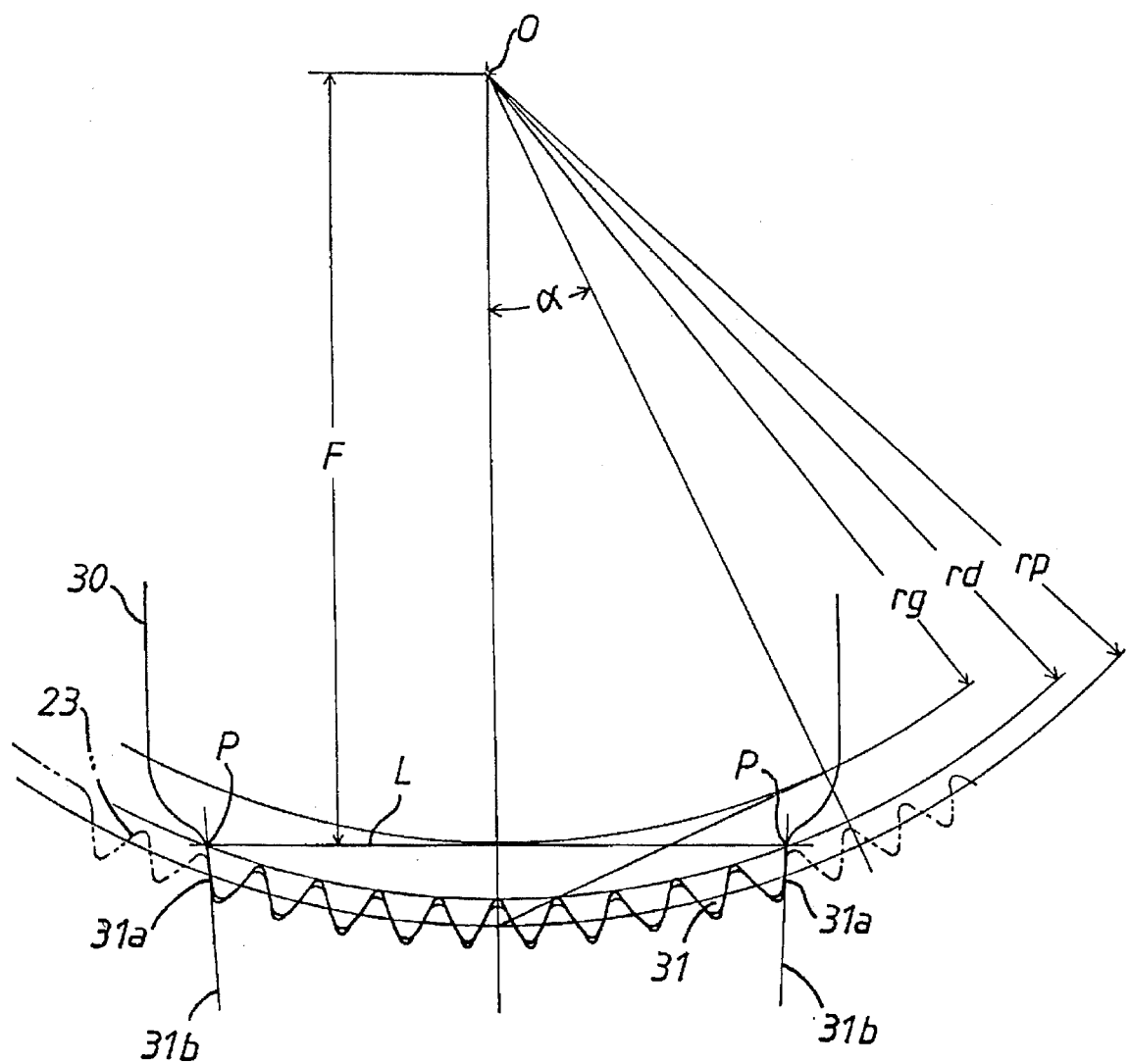
FIG. 6 illustrates an external tooth portion of the slide pawl shown in FIG. 5.
Figure 7:
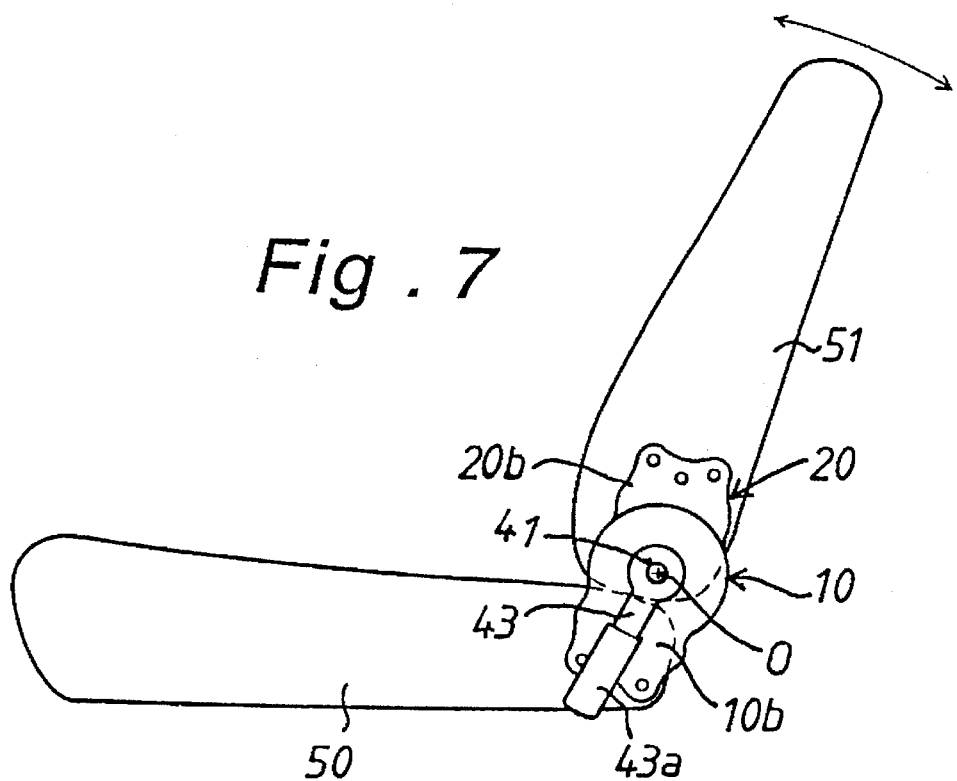
FIG. 7 is a side view of the reclining device assembled with a vehicle seat.

In FIGS. 1–7 there is illustrated a reclining device for a vehicle seat in accordance with the present invention which is adapted for use in a front or rear seat of the vehicle. As shown in FIGS. 1 and 2, the reclining device includes first and second arm members 10 and 20 which are connected with each other for relative rotation about a hinge center axis line O. As shown In FIG. 7, the first arm member 10 is fixed to one side of a frame structure of a seat cushion 50, and the second arm member 20 is fixed to one side of a frame structure 52 of a back rest 51. With the reclining device, the back rest 51 is assembled with the seat cushion 50 to be adjustably Inclined and retained at a desired angular position.

Figure 3:
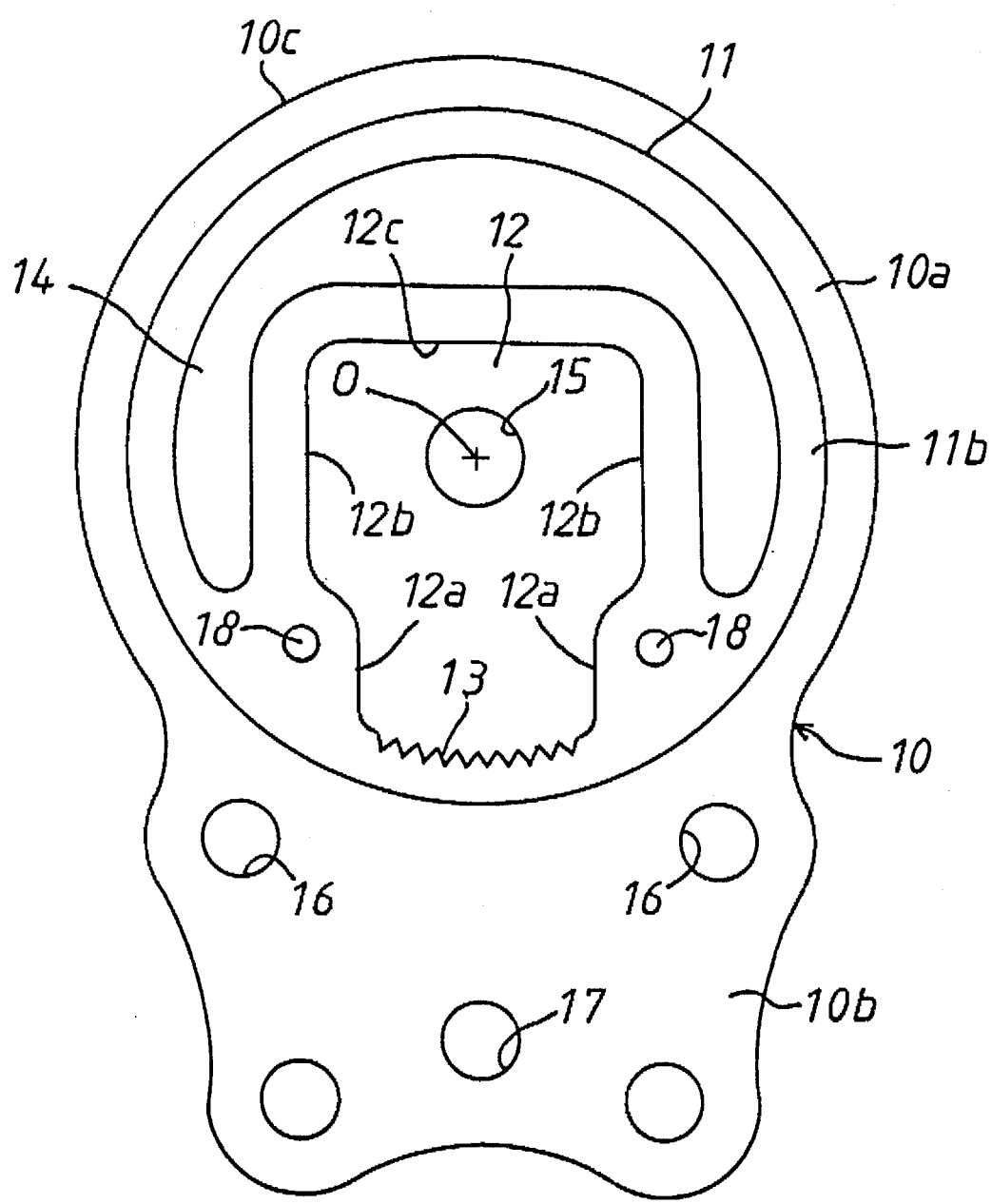
FIG. 3 a front view of a first arm member shown in FIGS. 1 and 2.

The first and second arm members 10 and 20 each are made of thick sheet metal. As shown In FIG. 3, the first arm member 10 has a connecting portion 10a formed with an annular outer circumference 10c and a mounting portion 10b radially extended from the connecting portion 10a. The mounting portion 10b is formed with a pair of laterally spaced holes 16 and three mounting holes 17 for attachment with the frame structure of seat cushion 50 or back rest 51. As shown in FIGS. 1 and 3, the connecting portion 10a of first arm member 10 is formed with a central hole 15 for alignment with the hinge center axis line O and an annular protruded portion 11 concentrically spaced from the annular outer circumference 10c in a small distance. The annular protruded portion 11 is formed by half-blanking using a punch and a die. With the half blanking, an annular recessed portion 11a is formed at the backside of first arm member 10 in the same diameter as that of the annular protruded portion 11.

Formed within the annular protruded portion 11 are a guide portion 12 and a C-letter shaped portion 14 which are recessed from the upper surface 11b of annular protruded portion 11. The recessed guide portion 12 is formed with a pair of laterally spaced first parallel guide surfaces 12a, 12a, a pair of laterally spaced second parallel guide surfaces 12b, 12b and a lateral guide surface 12c. The recessed guide portion 12 is further formed with an internal tooth portion 13 opposed to the lateral guide surface 12c. The recessed guide portion 12 is formed with the internal tooth portion 13 during the half-blanking process. The profile of the Internal tooth portion 13 will be described In detail later. Formed on the annular protruded portion 11 are a pair of projections 18 which are protruded toward the backside of the connecting portion 10a. The projections 18 are formed larger in height than the depth of the recessed guide portion 12.

Figure 4:
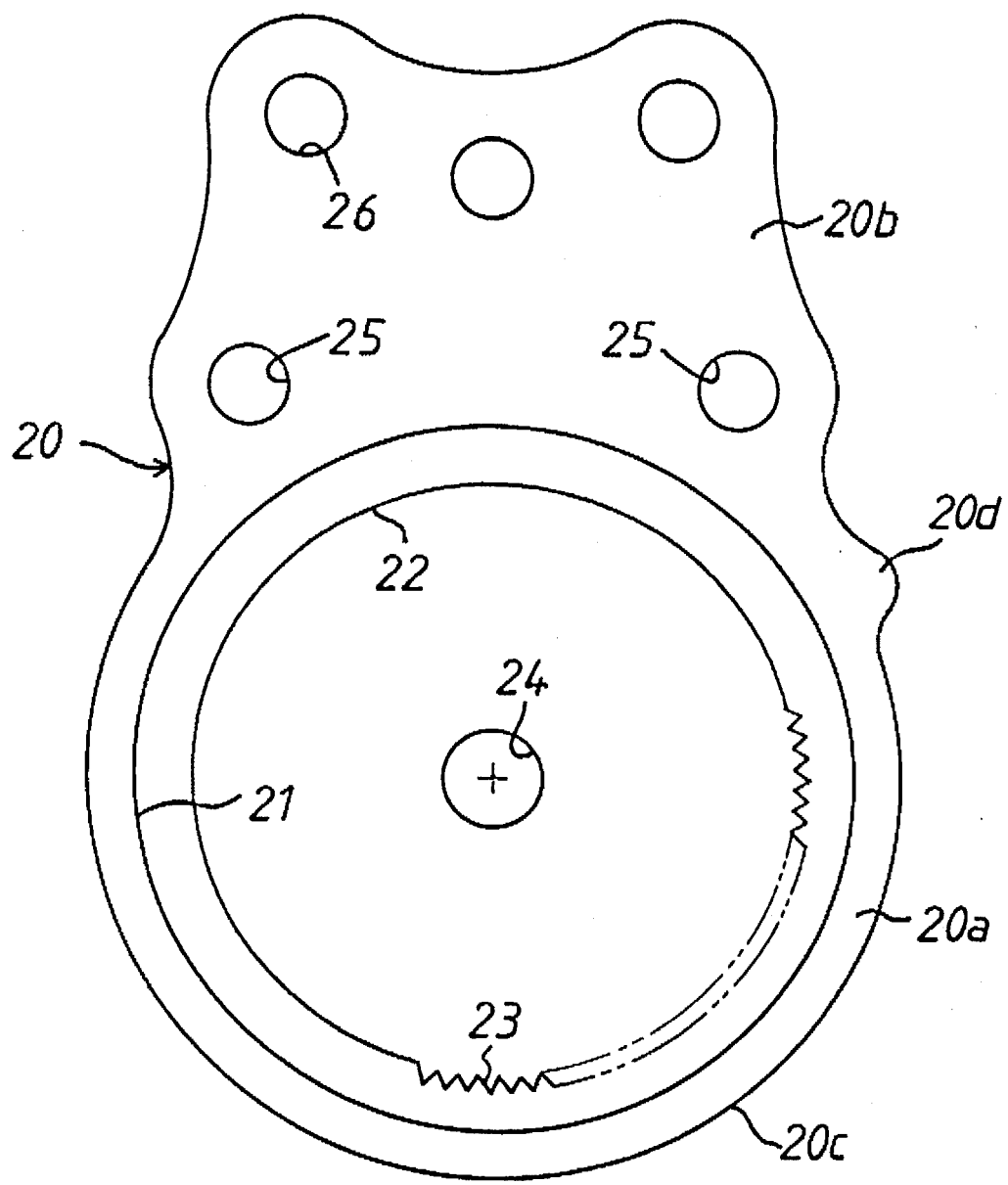
FIG. 4 is a front view of a second arm member shown in FIGS. 1 and 2.

As shown in FIG. 4, the second arm member 20 has a connecting portion 20a formed with an annular outer circumference 20c and a mounting portion 20b radially extended from the connecting portion 20a. The mounting portion 20b of second arm member 20 is formed with a pair of laterally spaced holes 25, 25 and three mounting holes 26 for attachment with the frame structure of the back rest 51 or seat cushion 50. The mounting portion 20b is also formed with a projection 20d for engagement with one of stepped guide pins 19 fixed to the first arm member 10. As shown in FIG. 4, the connecting portion 20a of second arm member 20 is formed with a central hole 24 for alignment with the hinge center axis line O and an annular recessed portion 21 concentrically spaced from the annular outer circumference 20c in a small distance. The annular recessed portion 21 is formed therein with a circular recessed portion 22 concentric with the central hole 24 and formed with an arc shaped internal tooth portion 23 that extends less than 180° which is in the form of a portion of an involute gear wheel for engagement with an internal gear (not shown) the center of which is located on the hinge center axis line O. The circular recessed portion 22 is formed with the internal tooth portion 23 during the half-blanking process.

As shown in FIG. 5, a slide pawl 30 is slidably supported by the parallel guide surfaces 12a and 12b of the recessed guide portion 12 of first arm member 10 to be moved in a radial direction with respect to the center hole 15. The slide pawl 30 is formed at one end thereof with an external tooth portion 31 the profile and pitch of which are the same as those of the internal tooth portion 13. A cam element 35 located within a recessed portion 32 of the slide pawl 30 is coupled at its boss portion 36 with the central hole 15 of first arm member 10 and engaged with a cam surface 32a formed on the recessed portion 32 to move the slide pawl 30 toward and away from the internal tooth portion 13 of first arm member 10. In a condition where the slide pawl 30 and cam element 35 have been assembled with the first arm member 10 as described above, the annular recessed portion 21 of second arm member 20 is coupled with the annular protruded portion 11 of first arm member 10 in such a manner that the boss portion 36 of cam element 35 is loosely coupled with the central hole 24 of second arm member 20 to allow relative rotation of the first arm member 10 to the second arm member 20. Thereafter, the stepped guide pins 19 are inserted into the holes 16 of first arm member 10 and fixed to the first arm member 10 so that each flange 19a of stepped guide pins 19 is engaged with the annular outer circumference 20c of second arm member 20, while a stepped retainer pin 27 and a stepped guide pin 28 are inserted into the holes 25 of second arm member 20 and fixed to the second arm member 20 so that respective flanges 27a, 28a of stepped pins 27, 28 are engaged with the annular circumference 10c of first arm member 10. Thus, the first and second arm members 10 and 20 are slidably engaged at the coupled portion of annular protruded portion 11 and recessed portion 21 for relative rotation about the hinge center axis line O.

As shown in FIGS. 1 and 2, a release shaft 41 coaxial with the hinge center axis line O has a square portion 41a which is inserted into the corresponding square hole of boss portion 36 of cam element 35 for rotation therewith. A bracket 40 has a flange formed with a pair of laterally spaced holes 40c which are engaged with the projections 18 of first arm member 10 to position the bracket 40 in place. The bracket 40 is secured to the front surface of first arm member 10 by projection welding, and the distal end of release shaft 41 is rotatably supported by the bracket 40. A torsion spring 42 is wound around the release shaft 41 located between the first arm member 10 and bracket 40. The torsion spring 42 is engaged at its one end 42a with a recessed portion 40b of bracket 40 and at its other end 42b with a radial groove 41b formed on the distal end of the release shaft 41 to bias the cam element 35 and release shaft 41 clockwise in FIG. 5. Under the load of torsion spring 42, a projection 35a of the cam element 35 is pressed into contact with a first engagement surface 32a of the recessed guide portion 32 to maintain meshing engagement of the external tooth portion 31 of slide pawl 30 with the internal tooth portions 13 and 23 of first and second arm members 10 and 20. In such a condition as described above, another projection 35b of the cam element 35 is pressed into contact with the lateral guide surface 12c of recessed guide portion 12 to provide a clearance between the boss portion 36 of cam element 35 and the center hole 24 of second arm member 20. This is useful in preventing the cam element 35 from movement caused by engagement of the boss portion 36 with the center hole 24 even if the component parts are deformed by a rotational force acting on the arm members 10 and 20.

As shown in FIGS. 1 and 2, a release arm 43 is fixed to the distal end of release shaft 41 projected from the bracket 40. When the release arm 43 is rotated in a direction indicated by an arrow in FIG. 2 to rotate the cam element 35 against the load of torsion spring 42, the projection 35a of cam element 35 is engaged with a second engagement surface 32b of the recessed portion 32 as shown by imaginary lines in FIG. 5 to disengage the slide pawl 30 from the internal tooth portions 13 and 23 of first and second arm members 10 and 20. Thus, the cam element 35 acts as an interlocking element to convert the rotation of release shaft 41 into vertical movement of the slide pawl 30.

Although in FIG. 1 there Is illustrated the reclining devices attached to one side of the vehicle seat, the same reclining device as the illustrated reclining device is attached to the other side of the vehicle seat and is interconnected with the release shaft 41 of the illustrated reclining device by means of a tubular connecting rod 44 the opposite ends of which are coupled with the square portions 41a of the release shafts 41 of both reclining devices. As shown in FIGS. 1 and 2, a spiral spring 45 is engaged at its inner end 45a with a recessed portion 40a of bracket 40 and at its outer end 45b with a stem portion 27b of the retainer pin 27 fixed to the second arm member 20 to bias the back rest 51 forward.

As shown in Fig. 1, the slide pawl 30 is disposed between the recessed guide portion 12 of first arm member 10 and the circular recessed portion 22 of second arm member 20 and is biased by engagement with the cam element 35 loaded by the torsion spring 42 so that the external tooth portion 31 of slide pawl 30 Is maintained in engagement with the internal tooth portions 13 and 23 of first and second arm members 10 and 20. Although in this embodiment, the pitch diameter of the internal tooth portion 13 is the same as that of the internal tooth portion 23, the center O' of the pitch circle of the internal tooth portion 13 is displaced in a distance e from the hinge center axis line O as shown in FIG. 5 to provide an appropriate clearance between the internal tooth portion 13 and the external tooth portion 31 of slide pawl 30. With such an arrangement as described above, the external tooth portion 31 of slide pawl 30 is constantly engaged with the internal tooth portion 23 even if the center of the internal tooth portion 13 or 23 is displaced from the hinge center axis line O due to manufacturing error. In this instance, however, the engagement depth of the external tooth portion 31 and internal tooth portion 13 Is reduced.

To eliminate a clearance between the external tooth portion 31 of slide pawl 30 and the internal tooth portion 13 of first arm member 10 in a circumferential direction caused by reduction of the engagement depth, the profile and number of teeth of the external tooth portion 31 are determined as shown in FIG. 6 where tangents 31b, 31b of the outermost teeth surfaces 31a, 31a crossing a pitch circle defined by a pitch radius r, at a maximum angle are located in parallel to one another or converging toward one another relative to the crest of the external tooth portion 31. When the external tooth portion 31 is in the form of involute teeth, the profile and number of teeth of the external tooth portion 31 are determined under the following conditions.

$$r_g = F$$

where $r_p$: Pitch radius $r_d$: Radius of the root circle of the tooth portion 31

$r_g$: Radius of a ground circle

L: Line between intersections P of the outermost teeth surfaces 31a and the root circle F: Length of a perpendicular line from the hinge center axis line O to the line L α: Pressure angle When the release arm 43 is rotated against the load of torsion spring 42, the cam element 35 is rotated counterclockwise to disengage the slide pawl 30 from the internal tooth portions 13 and 23 of first and second arm members 10 and 20. As a result, relative rotation of the second arm member 20 to the first arm member 10 is permitted about the hinge center axis line O at the coupled surfaces of the annular protruded portion 11 and recessed portion 21. In such a condition, the second arm member 20 is biased forward by the load of spiral spring 45 so that the back rest 51 can be adjusted to a desired angular position. When the release arm 43 is released after the back rest 51 has been adjusted to the desired angular position, the load of torsion spring 42 causes the external tooth portion 31 of slide pawl 30 to engage with the internal tooth portions 13 and 23 of first and second arm members 10 and 20 to retain the second arm member 20 at the adjusted angular position. During such operation as described above, the rotational force applied to the second arm member 20 is received by the engagement of the external tooth portion 31 of slide pawl 30 with the internal tooth portion 23 of second arm member 20, the engagement of the external tooth portion 31 of slide pawl 30 with the internal tooth portion 13 of first arm member 10, the engagement of the slide pawl 30 with the guide surfaces 12a, 12b of first arm member 10 and the coupled surfaces of the annular protruded portion 11 and recessed portion 21. Accordingly, the rotational force applied to the second arm member 20 does not cause any undesired influence on the operation of the cam element 35.

If the internal tooth portion 23 of second arm member 20 is formed smaller in its pitch diameter to provide the reclining device in a small size, the connecting strength of the first and second arm members 10 and 20 is ensured since the arm members 10 and 20 are engaged with each other at the coupled portion of their annular protruded portion 11 and recessed portion 21. Since the slide pawl 30 and cam element 35 are disposed between the first and second arm members 10 and 20 and contained within an inside space of the internal tooth portion 23, the coupled portion of the annular protruded portion 11 and recessed portion 21 serves to prevent entry of dust into the inside space from the exterior and to enhance durability of the reclining device.

Although in the above embodiment the external tooth portion 31 of slide pawl 30 has been provided for engagement with the internal tooth portions 13 and 23 of first and second arm members 10 and 20, the internal tooth portion 13 of first arm member may be eliminated. In such a case, the rotational force applied to the second arm member 20 is received by the engagement of slide pawl 30 with the guide surfaces 12a, 12b of first arm member 10.

Figure 8:
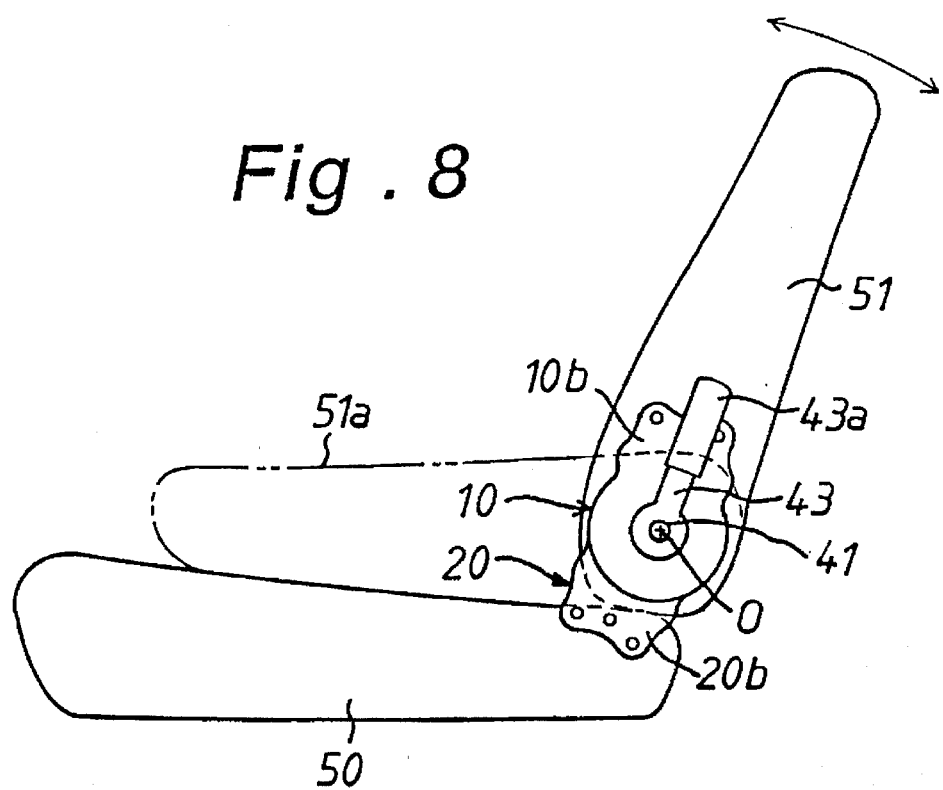
FIG. 8. is a side view of the reclining device assembled with another vehicle seat.

Although in the above embodiment, the first and second arm members 10 and 20 have been respectively fixed to the frame structures of seat cushion 50 and back rest 51, the first and second arm members 10 and 20 may be respectively fixed to the frame structures of back rest 51 and seat cushion 50 as shown In FIG. 8. In such a case, the release arm 43 is located above the seat cushion 50 at the one side of the back rest 51 so that the back rest 51 can be put over the seat cushion 50 as shown by imaginary lines 51a in FIG. 8.

What is claimed is:

1. A reclining device for a vehicle seat, comprising:

a first arm member for attachment to a frame structure of a seat cushion or a back rest of the vehicle seat;

a second arm member for attachment to a frame structure of the other of the back rest or the seat cushion and connected with said first arm member for relative rotation about a hinge center axis line, said second arm member being formed with an arc shaped internal tooth portion that extends less than 180° and is concentric with the hinge center axis line;

a slide pawl slidably supported within said first arm member to be moved in a radial direction with respect to the hinge center axis line and having an arcuate external tooth portion engageable with the internal tooth portion of said second arm member;

a release shaft rotatably supported on said first arm member coaxially with the hinge center axis line and being loaded by resilient means in a rotational direction;

a release arm integral with one end of said release shaft to rotate said release shaft against the load of said resilient means; and interlocking means provided between said release shaft and said slide pawl to maintain engagement of the external tooth portion of said slide pawl with the internal tooth portion of said second arm member under the load of said resilient means, wherein said first arm member is formed with an annular protruded portion concentric with the hinge center axis line, said second arm member is formed with an annular recessed portion coupled with the annular protruded portion of said first arm member for relative rotation about the hinge center axis line, the internal tooth portion of said second arm member is located radially inside said annular recessed portion, and said slide pawl and said interlocking means are disposed between said first and second arm members radially inside the internal tooth portion of said second arm member.

2. A reclining device as recited in claim 1, wherein said first arm member is formed with an arcuate internal tooth portion concentric with the hinge center axis line, the pitch diameter and profile of which are the same as those of the internal tooth portion of said second arm member, and the internal tooth portion of said first arm member being arranged to be engageable with the external tooth portion of said slide pawl.

3. A reclining device as recited in claim 2, wherein the profile and number of teeth of said external tooth portion are determined based on tangents of outermost teeth surfaces of first and second teeth in said external tooth portion, said first and second teeth being opposed to one another relative to a longitudinal centerline of said first arm member and crossing a pitch circle defined by a pitch radius of said external tooth portion at a maximum angle whereby said tangents of said opposing first and second teeth are defined parallel to one another or converging toward one another relative to the crest side of said external tooth portion.

4. A reclining device as recited in claim 2, wherein the center of a pitch circle of the internal tooth portion of said first arm member is displaced in a predetermined distance from the hinge center axis line forming a clearance between said internal tooth portion and the external tooth portion of said slide pawl.

5. A reclining device for a vehicle seat, comprising:

a first arm member for attachment to a frame structure of a seat cushion or a back rest of the vehicle seat, said first arm member being formed with an annular protruded portion concentric with the hinge center axis line;

a second arm member for attachment to a frame structure of the other of the back rest or the seat cushion and connected with said first arm member for relative rotation about a hinge center axis line, said second arm member being formed with an annular recessed portion coupled with the annular protruded portion of said first arm member for relative rotation about the hinge center axis line and being formed with an arc shaped internal tooth portion that extends less than 180° and is concentric with said hinge center axis line and located radially inside said annular recessed portion;

a slide pawl slidably supported within said first arm member to be moved in a radial direction with respect to said hinge center axis line and having an arcuate external tooth portion engageable with the internal tooth portion of said second arm member;

a release shaft rotatably supported on said first arm member coaxially with said hinge center axis line and being loaded by resilient means in a rotational direction;

a release arm integral with one end of said release shaft to rotate said release shaft against the load of said resilient means; and interlocking means provided between said release shaft and said slide pawl to maintain engagement of said external tooth portion of said slide pawl with said internal tooth portion of said second arm member under the load of said resilient means, wherein said slide pawl and said interlocking means are disposed between said first and second arm members radially inside said internal tooth portion of said second arm member, said first arm member is formed with an arcuate internal tooth portion concentric with said hinge center axis line, the pitch diameter and profile of which are the same as those of the internal tooth portion of said second arm member, the internal tooth portion of said first arm member being arranged to be engageable with the external tooth portion of said slide pawl, and the profile and number of teeth of said external tooth portion are determined based on tangents of outer-most teeth surfaces of first and second teeth in said external tooth portion, said first and second teeth being opposed to one another relative to a longitudinal centerline of said first arm member and crossing a pitch circle defined by a pitch radius of said external tooth portion at a maximum angle whereby the tangents of said opposing first and second teeth are defined parallel to one another or converging toward one another relative to the crest side of said external tooth portion.

* * * * *